US009063980B2

(12) United States Patent
Dhamankar et al.

(10) Patent No.: US 9,063,980 B2
(45) Date of Patent: Jun. 23, 2015

(54) LOG CONSOLIDATION

(71) Applicant: Microsoft Corporation, Redmond, WA (US)

(72) Inventors: Robin Dhananjay Dhamankar, San Francisco, CA (US); Peter Byrne, Redmond, WA (US); Hanumantha Rao Kodavalla, Sammamish, WA (US)

(73) Assignee: Microsoft Technology Licenising, LLC, Redmond, WA (US)

( * ) Notice: Subject to any disclaimer, the term of this patent is extended or adjusted under 35 U.S.C. 154(b) by 124 days.

(21) Appl. No.: 13/723,961

(22) Filed: Dec. 21, 2012

(65) Prior Publication Data

US 2014/0181036 A1 Jun. 26, 2014

(51) Int. Cl.
*G06F 7/00* (2006.01)
*G06F 17/00* (2006.01)
*G06F 17/30* (2006.01)

(52) U.S. Cl.
CPC .... *G06F 17/30516* (2013.01); *G06F 17/30144* (2013.01); *G06F 17/30185* (2013.01); *G06F 17/30489* (2013.01)

(58) Field of Classification Search
None
See application file for complete search history.

(56) References Cited

U.S. PATENT DOCUMENTS

| 7,076,508 | B2 | 7/2006 | Bourbonnais et al. | |
| 7,743,030 | B1 * | 6/2010 | Korolev et al. | 707/648 |
| 8,126,853 | B2 | 2/2012 | Sakamoto | |
| 8,484,259 | B1 * | 7/2013 | Makkar et al. | 707/827 |
| 2003/0225872 | A1 | 12/2003 | Bartek et al. | |
| 2004/0030703 | A1 * | 2/2004 | Bourbonnais et al. | 707/100 |
| 2010/0257138 | A1 * | 10/2010 | Wang et al. | 707/634 |
| 2011/0251997 | A1 * | 10/2011 | Wang et al. | 707/634 |
| 2012/0209898 | A1 | 8/2012 | Leigh | |

OTHER PUBLICATIONS

"How to Guide: Consolidating Multiple SQL Server Systems onto Dell Poweredge Server using Microsoft Hyper-V", Published on: Apr. 24, 2009, Available at: http://www.dell.com/downloads/global/solutions/public/white_papers/ Virtualization_Best_Practices_Guide_for_SQL_Server.pdf.
Pawar, Shashank, "Running SQL Server 2008 in a Hyper-V Environment", Published on: Oct. 5, 2008, Available at: http://download.microsoft.com/download/d/9/4/d948f981-926e-40fa-a026-5bfcf076d9b9/SQL2008inHyperV2008.docx.
McCown, Jennifer, "Configuring Database Files for Optimal Perfomance", Published on: Jan. 1, 2010, Available at: http://sqlserverpedia.com/wiki/Configuring_Database_Files_for_Optimal_Perfomance.
"AD RMS Log Consolidation Sample", Retrieved on: Nov. 26, 2012, Available at: http://technet.microsoft.com/en-us/library/dd772687(v=ws.10).aspx.

* cited by examiner

*Primary Examiner* — Robert Beausoliel, Jr.
*Assistant Examiner* — Michael Pham
(74) *Attorney, Agent, or Firm* — Aneesh Mehta; Dolan Stein; Micky Minhas

(57) ABSTRACT

Consolidating a set of tenant log streams from separate user databases into a consolidated log stream. The method includes receiving a plurality of tenant log streams from separate user data bases. The method further includes recording the plurality of tenant log streams as a consolidated log stream. The method further includes maintaining metadata about the consolidated log stream to map log records from the plurality of tenant log streams to their location in the consolidated log stream.

20 Claims, 5 Drawing Sheets

LOG CONSOLIDATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Computing systems often store data using databases. Databases are typically associated with a database log which contains a history of actions executed by a database management system. The log can be used to recover from database crashes or hardware failures. In particular, if a database is found to be inconsistent, the database log can be used to put the database back into a last known correct state. The database log is typically maintained by streaming the history of actions to storage.

For optimal performance, databases exploit the sequential nature of access to the log by keeping the log on a dedicated disk. Cloud environments typically have a large number of tenants and thus a large number of user databases. To control costs, it may be useful in cloud environments to consolidate a large number of user databases on a single node (i.e. machine). However, because the node has far fewer disks than the number of databases it hosts, it is impractical to have a dedicated disk for each database log.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method of consolidating a set of tenant log streams from separate user databases into a consolidated log stream. The method includes receiving a plurality of tenant log streams from separate user databases. The method further includes recording the plurality of tenant log streams as a consolidated log stream. The method further includes maintaining metadata about the consolidated log stream to map log records from the plurality of tenant log streams to their location in the consolidated log stream.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
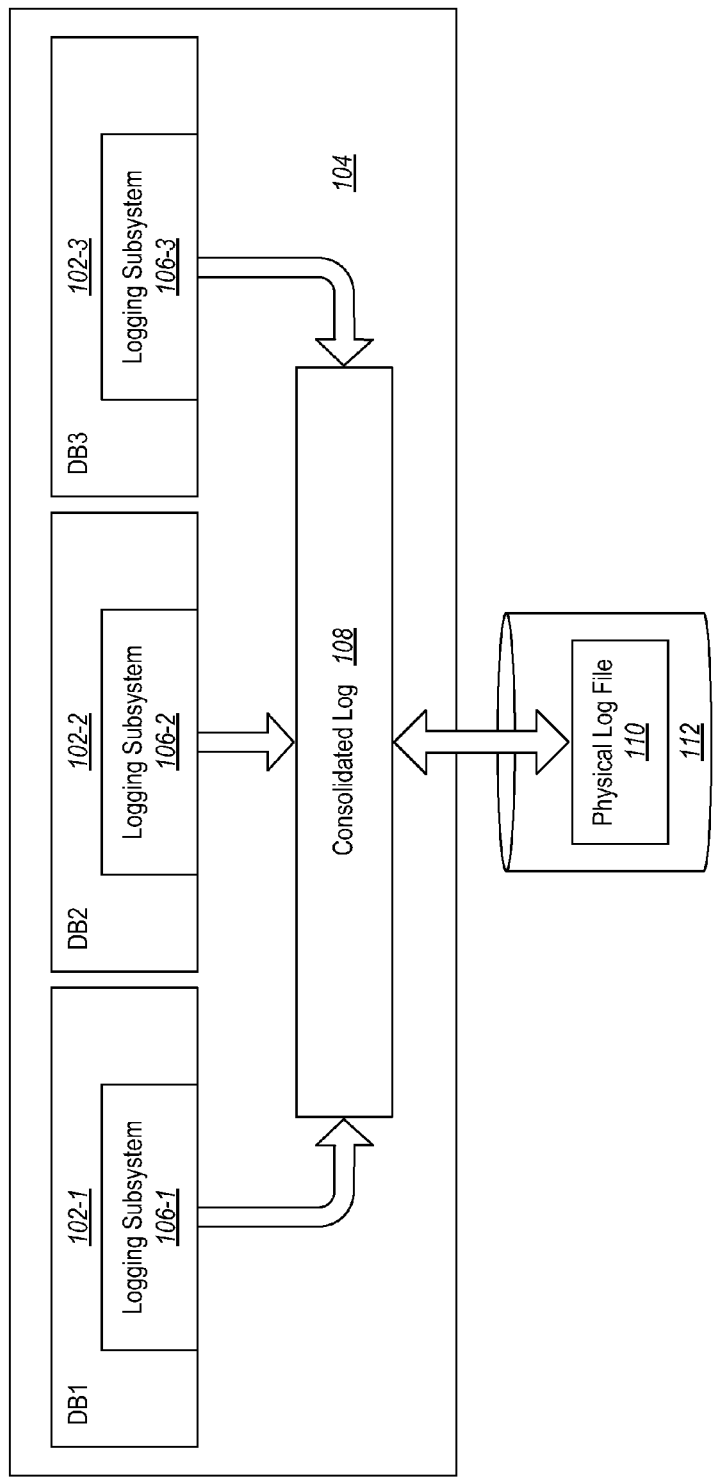
FIG. 1 illustrates a set of tenant logging systems and a consolidated logging system.

Some embodiments described herein are able to consolidate the logs of various user databases into a single consolidated log. An example of this is illustrated in FIG. 1, illustrating three databases 102-1, 102-2, and 102-3 implemented in a remote service provider system 104. Each of the databases includes a logging subsystem 106-1, 106-2, in 106-3 respectively. Each of the logging subsystems is coupled to a consolidated log 108. The consolidated log 108 is able to create a consolidated log file 110. Thus, log data from a plurality of different databases can be consolidated into a consolidated log file 110 that can be stored on a single disk 112. While not shown here, separate metadata is maintained including information about the database from which log data originally originated from, such that a view can be generated for each of the different databases of the log information pertinent to the particular databases. As illustrated herein, this functionality is accomplished by implementing various features now described.

Embodiments may implement virtualization at the I/O subsystem. This allows physical log streams from different databases to be virtualized into a consolidated log stream that can be stored in the physical log file 110. Embodiments may provide asynchronous I/O abstraction to tenant file I/O mechanisms illustrated herein as File Control Blocks (FCBs). This allows individual tenant databases (referred to herein generically at 102) to write log streams into the consolidated log 108. Embodiments may group multiple I/Os to retain benefits of consolidation. For example, as illustrated in FIG. 1, log streams from a number of different databases are consolidated into a consolidated log 108.

Some embodiments illustrated herein implement mapping of data and the physical log file 110 to allow the data to be correlated with its originating database 102. The mapping is performed in a way such that the mapping is efficient while still achieving persistence and recovery of the mapping through the same log stream.

Some embodiments illustrated herein implement functionality for managing the consolidated stream. This may be accomplished through sector-remapping and the move-to-data strategies discussed in more detail below.

Some embodiments illustrated herein may make use of abstraction. In particular, embodiments may facilitate using existing components and composing them into a working solution for solving the log consolidation problem.

The following illustrates a system configured to append multiple user database log streams to a shared physical sequential log while maintaining the identity of each stream. This may allow each stream to be independently provisioned, backed up and exported for high availability.

Such embodiments may be able to ensure sequential I/O to the log in the common case.

Additionally or alternatively, embodiments may be implemented such that the number of individual log streams on a node is independent of the number of disks available.

Additionally or alternately, embodiments may be implemented such that the log based functionality that depends on having a separate log (e.g. physical log based high availability, log backup, log shipping, database snapshots, transparent database encryption, etc.) works seamlessly.

Additionally or alternatively, embodiments may be implemented such that existing on-disk format is preserved so that a database may be exported (using database backup and restore functionality) from a consolidated environment to one that uses individual log files and vice versa.

Alternatively or additionally, embodiments may be implemented such that to the extent possible, embodiments use existing remote based (e.g. cloud based) database infrastructure.

Figure 2:
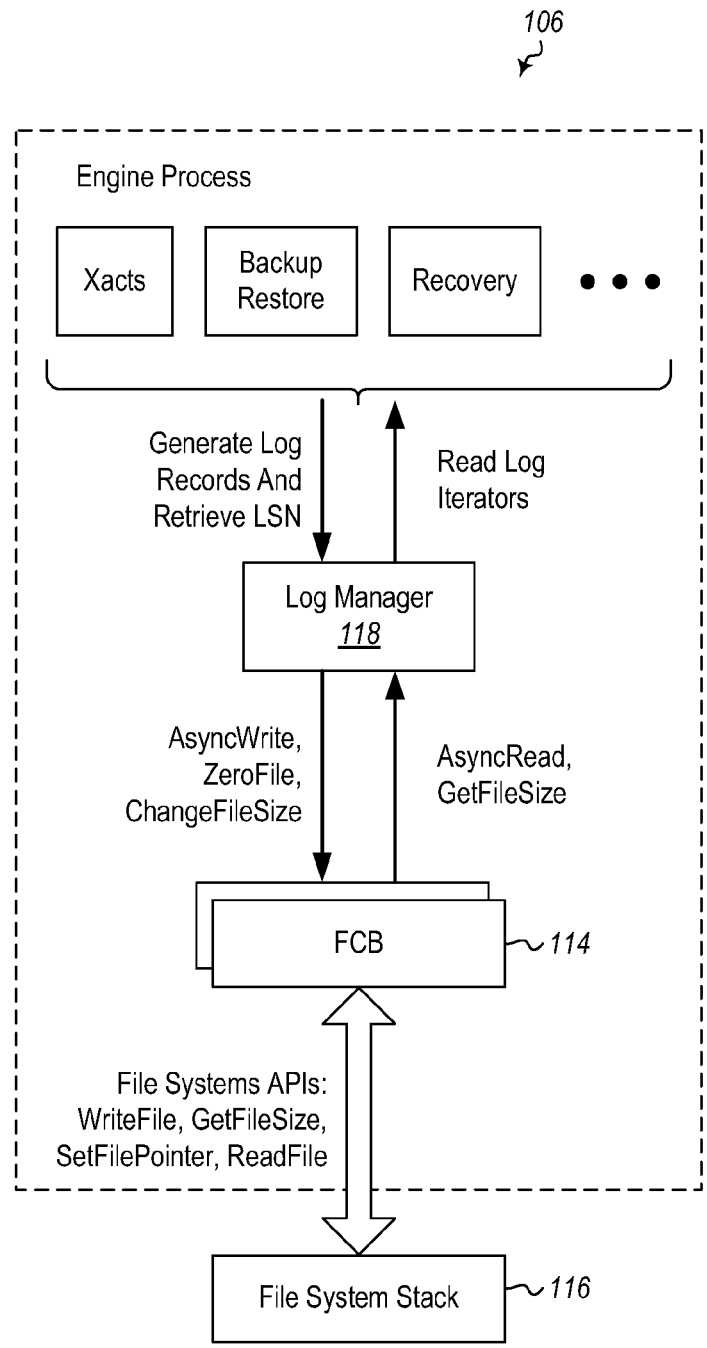
FIG. 2 illustrates a logging architecture.

To understand how a consolidated log 108 can be managed, it is first helpful to understand how individual database logging functions. FIG. 2 illustrates an example of a SQL Server® database available from Microsoft® Corporation of Redmond Washington. FIG. 2 illustrates a logging subsystem 106. In the example illustrated, an I/O subsystem 114 (illustrated as an FCB component) is used to write data to the file system stack 116. The I/O subsystem is not bypassed by any higher level component that needs to access the contents of a log file. Therefore embodiments consolidate logs at the I/O subsystem.

Figure 3:
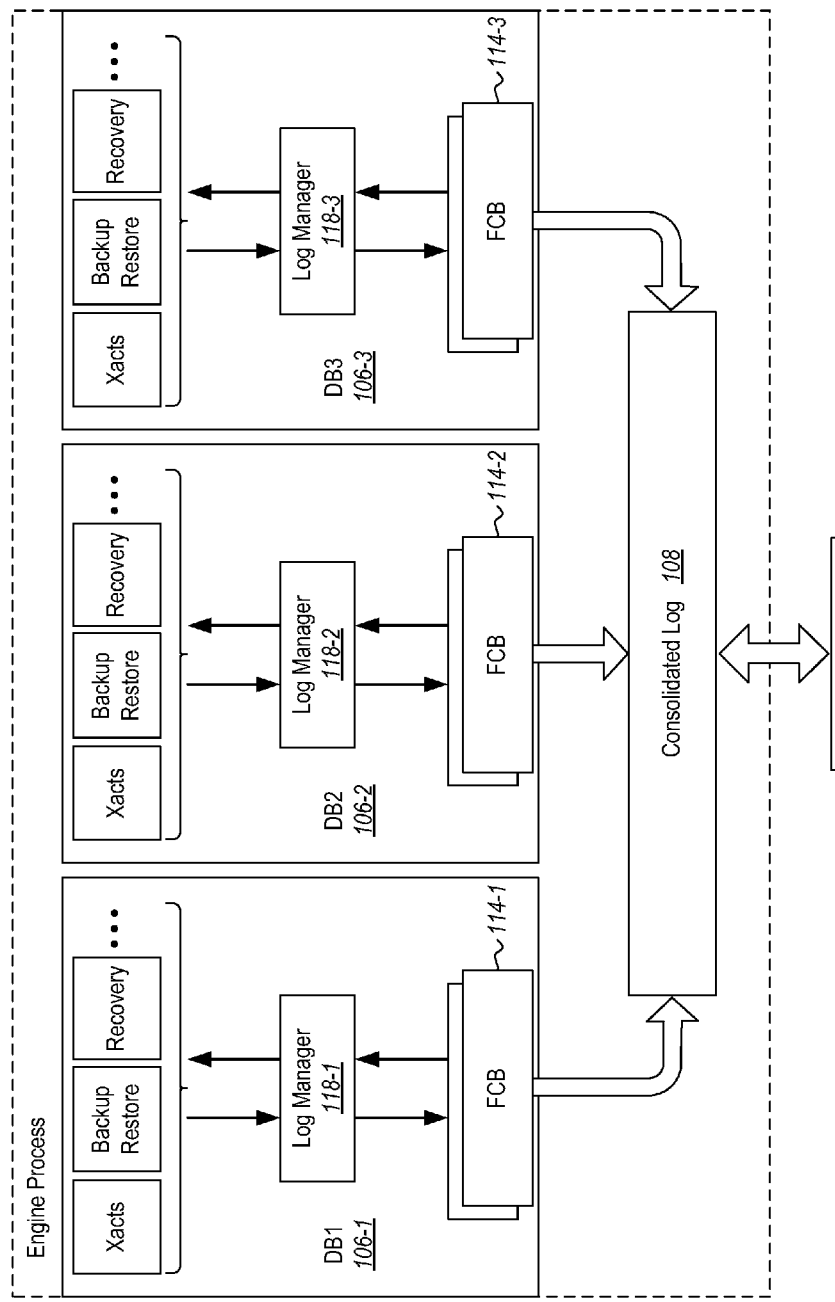
FIG. 3 illustrates additional details regarding a consolidated logging system.

Each log manager 118 operates on its log stream as though it were an independent file. This preserves the structure of each stream thereby having no impact on existing log based functionality. As illustrated in FIG. 3, the consolidated log 108 intercepts write requests to the individual streams from the I/O subsystems 114-1, 114-2 and 114-3 (referred to herein generically as 114) and linearizes them into the physical log file 110.

The consolidated log provides (1) virtualization functionality, (2) consolidation functionality, and (3) mapping functionality.

To implement virtualization, the consolidated log exposes file system like APIs over the consolidated log stream to the database engine subsystems 114. In a very specific example, embodiments may expose NTFS-like APIs to a SQL Server® Engine FCB layer. Embodiments do not need to support all of the file system APIs, but rather only the ones needed for log files. In the NTFS and SQL Server® example, embodiments may support the following:

WriteFile to write N sectors at a specified offset
ReadFile to read N sectors starting at a specified offset
ZeroFile
SetFileSize (Grow/Shrink)
Support for asynchronous I/Os To intercept the I/O subsystem specific I/Os embodiments may include another thin layer of I/O interfaces at the I/O subsystem level that mimic the I/O level interfaces as static virtual methods, then create a new class of I/O subsystem that derives from the I/O subsystem and override these virtuals for log consolidation.

To implement the consolidation functionality, the consolidated log 108 performs group writes from multiple log streams and linearizes them into a sequential stream. Multiple writes are grouped into a consolidated I/O to the consolidated stream. The consolidated log 108 does the necessary caching to facilitate such grouping.

Some embodiments maintain a mapping to map from an offset within a tenant log stream of a logging subsystem 104 of a database 102 to the corresponding location in the consolidated stream stored in the physical log file 110 of the consolidated log 108. This mapping should be persistent and recoverable. The mapping structure may not always fit in memory, so it may be spooled to disk while caching the frequently accessed portions in memory. In particular, the mapping may map a stream identifier and an offset in a local stream to an offset in a consolidated log stream.

Figure 4:
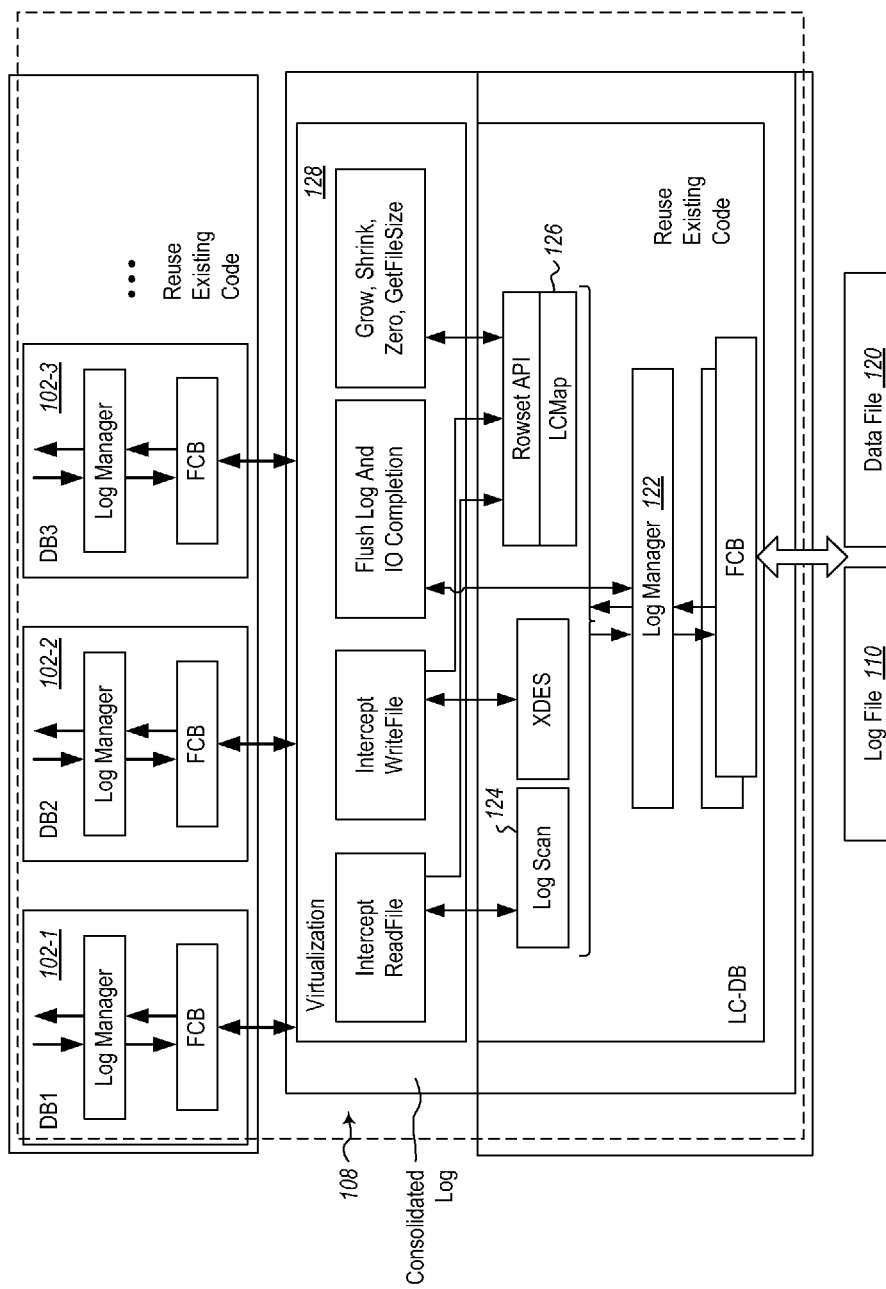
FIG. 4 illustrates still further additional details regarding a consolidated logging system.

With reference to FIG. 4, the following now illustrates the architecture of a consolidated log 108. The consolidated log 108 may be a standard database. For example, the consolidated log 108 may be itself a SQL Server® Database. The consolidated log 108 may be referred to herein as "log consolidation host" or simply "host". The consolidated log 108 includes a physical log file 110 and a data file 120. The log manager 122 of the host manages the physical consolidated stream. Log files of a given user database 102 (hereafter referred to as a tenant) are virtualized with their offsets mapped to the specific locations in the consolidated log file 110 where they are eventually located.

Each sector in the user database log file is written as a separate log record in the consolidated log stream. A new log record type (illustrated herein as LOP_TENANT_LOG) is introduced whose fixed size fields include metadata about the tenant and the variable portion includes the data from the tenant log stream. This abstraction ensures that the on-disk structure of the consolidated log 108 is unchanged and the log manager 122 and log scanners 124 of the host can operate on it like any other log file.

The mapping is stored in the host 108 in internal tables (referred to as LCMap 126 herein) which are suitably indexed for fast access. Updates to the map internal tables 126 are logged as regular log records in the consolidated log. Since the consolidated log stream also contains log records for updates to the LCMap 126, the durability of the contents of tenant 102 log streams and the corresponding mapping is ensured through a consolidated I/O. The LCMap 126 effectively stores mapping from: a stream identifier and a sector number (or other unit of granularity in a given stream) to: a log sequence number (or other identifier that can be used to identify a log record) of the tenant log record that has data for the sector.

As shown in the FIG. 4, this novel architecture facilitates re-use of many existing standard database components while only developing a thin virtualization layer 128 to intercept I/O and serve them using the consolidated stream.

The following now illustrates tenant log read and write requests. Writes to the tenant log are now illustrated. Log writes are sector aligned, so each write (and read) includes an integral number of sectors. For each sector:

(1) Start a transaction.
(2) Generate LOP_TENANT_LOG record that includes the contents of the sector as the payload and obtain its log sequence number.
(3) Insert/Update the mapping table to map (StreamId, Sector#) to the log sequence number in Step 2.
(4) Commit the transaction without flushing the log.
(5) The transaction can optionally be scoped for the complete write request (which includes N sectors).

During this process, the data is still in the cache of the consolidated log manager 122, when sufficient writes have accumulated, the consolidated log is written to disk. Only after the log has been written to disk, the tenant 102 is notified of I/O completion.

Reads are handled similarly. For each sector embodiments first access the mapping table LCMap 126 and retrieve the map log sequence number. Embodiments then position a log scanner on the map log sequence number and read the log record and copy the sector data to the read buffer.

The tenant I/O thread simply submits I/O requests to a queue. The actual reads and writes are handled by a pool of threads in the background thereby facilitating asynchronous I/O from the tenant's perspective. This also provides opportunity to re-use existing data structures such as log scanners which can be expensive to setup.

Zeroing a tenant file is achieved by simply updating the map to indicate that the corresponding sector is zero. Similarly tenant file size changes are achieved by growing and shrinking the LCMap 126 without actually affecting the physical log stream.

The following now illustrates details related to database recovery. From the perspective of recovery, the consolidated database 108 is just another database. The mapping structure is recovered like any other table. If the transaction that was started to write to a log on behalf of a tenant was incomplete, the mapping entry will not reflect the update and the corresponding write is considered to have failed. This does not affect correctness, as the tenant is notified of write completion only after the transaction was durably committed.

The recovery of the tenants 102 needs to access the consolidated database 108, therefore the consolidated database 108 is recovered before any of the tenants 102. Embodiments therefore ensure that the consolidated database 108 recovery does not have any dependence on the tenants 102. Any cross database transactions that involve the consolidated 108 and the tenant 102 should always choose the consolidated 108 as the coordinator.

The following illustrates details with respect to log truncation. The tenant log streams maintain the oldest log sequence number of interest to gate the truncation of the consolidated stream. When the tenant log truncates any portion of its log, it frees up the corresponding log records in the consolidated stream. The consolidated stream ensures that any log records that are required by any tenant are retained.

Idle databases that do not advance their log may hold up the truncation of the log. Two ways that this can be handled by the truncation include (1) sector re-mapping and (2) moving the log to data.

The following illustrates details regarding sector re-mapping. As the LCMap 126 provides a layer of in-direction, the contents in the consolidated stream can be moved without affecting the tenant 102. The background truncation task looks for old log records in the host that may be holding up truncation and re-maps the corresponding sectors by generating new log records at the end of the stream and updating the map to point to the new record instead.

The following illustrates details regarding moving a log to data. The LCMap 126 has an additional nullable blob field. The background task pushes the contents of the sector to the blob thereby freeing up the log records in the host. Any attempts to read these sectors will be served directly from LCMap 126 without having to go to the consolidated log at all.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
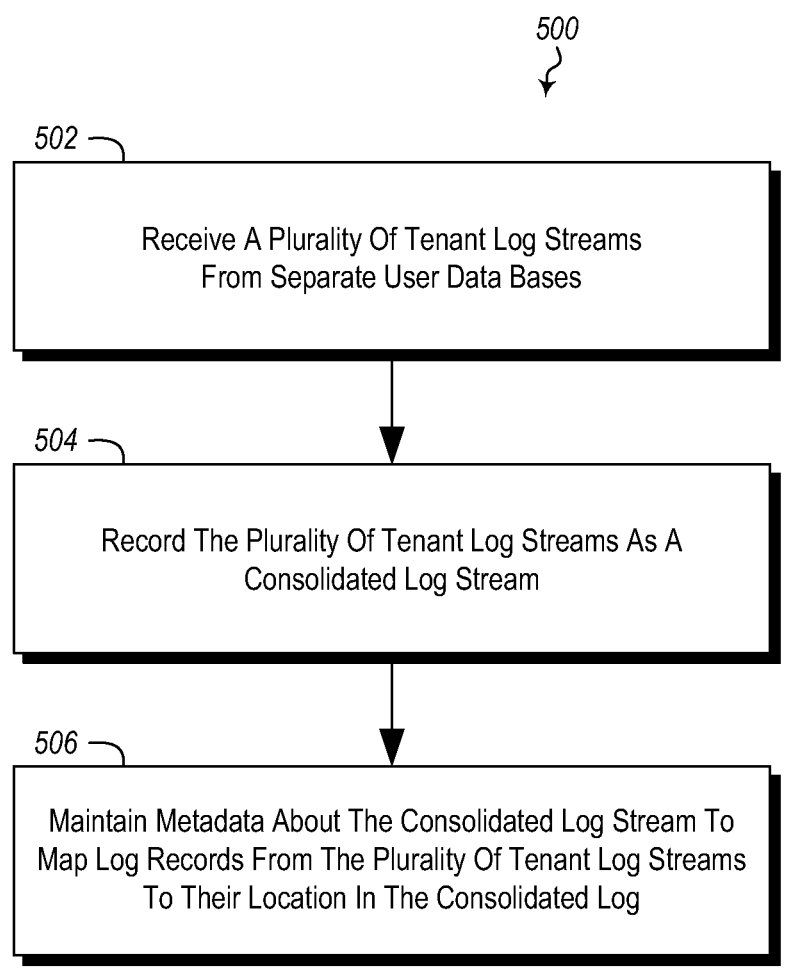
FIG. 5 illustrates a method of consolidating a set of tenant log streams from separate user databases into a consolidated log stream.

Referring now to FIG. 5, a method 500 is illustrated. The method includes acts for consolidating a set of tenant log streams from separate user databases into a consolidated log stream. The method includes receiving a plurality of tenant log streams from separate user data bases (act 502).

The method 500 further includes recording the plurality of tenant log streams as a consolidated log stream (act 504).

The method further includes maintaining metadata about the consolidated log stream to map log records from the plurality of tenant log streams to their location in the consolidated log stream.

The method 500 may be practiced where maintaining metadata comprises updating metadata in mapping tables to identify where data in the consolidated log stream came from. For example, FIG. 4 illustrates an LCMap that can be updated to identify what logs data comes from.

The method 500 may be practiced where recording the plurality of physical log streams as a consolidated log stream is performed by virtualizing the plurality of physical log streams into the consolidated log stream. For example, this may be done by providing asynchronous I/O abstractions to the tenant log files to facilitate the virtualization.

The method 500 may be practiced where maintaining metadata comprises using native indexing methods of a backing database to perform efficient and persistent, and recoverable mapping. For example, existing database infrastructure may be modified to implement the consolidated log.

The method 500 may further include recovering one or more of the separate user databases, wherein recovering one or more of the separate user databases comprises first recovering the database for the consolidated log stream and then recovering log streams for individual tenants.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a virtual computing environment that includes a plurality of tenant databases, a computer-implemented method of consolidating at a consolidated log host a set of tenant log streams from the plurality of tenant databases into a consolidated log stream so that the number of individual tenant log streams consolidated at the consolidated log host are independent of whether a number of disks are available at the consolidated log host, the computer-implemented method comprising:

at a virtualization layer of a log consolidation host, intercepting I/O requests from the plurality of tenant log streams from the plurality of tenant databases;

linearizing the intercepted I/O requests from the plurality of tenant log streams into a physical log file that forms a consolidated log stream; storing the consolidated log stream in a log file;

generating a map from metadata associated with each tenant log stream, the map identifying log records from the plurality of tenant log streams, and the log records being mapped to corresponding locations in the consolidated log stream to provide correlation of data associated with each tenant log stream consolidated into the consolidated log stream with a tenant database from which said data originated; and storing the map.

2. The computer-implemented method of claim 1, wherein generating the map from the metadata comprises updating metadata in mapping tables of the map as I/O requests for one or more of the plurality of tenant databases processed using the consolidated log stream.

3. The computer-implemented method of claim 1, wherein generating the map comprises mapping a stream identifier and an offset in each tenant log stream to a corresponding offset in the consolidated log stream.

4. The computer-implemented method of claim 1, generating the map comprises mapping a stream identifier and a sector number for each tenant log stream to a log sequence number of a corresponding tenant log record that has data for the sector number.

5. The computer-implemented method of claim 1, further comprising exposing file system like APIs over the consolidated log stream to a database engine.

6. The computer-implemented method of claim 1, wherein storing the map comprises using native indexing methods of a backing database to perform efficient and persistent mapping using the consolidated log stream.

7. The computer-implemented method of claim 1, further comprising recovering one or more of the plurality of tenant databases by first recovering a database for the consolidated log stream and then recovering tenant log streams for individual tenant databases.

8. In a virtual computing environment that includes a plurality of tenant databases, a computer readable storage device comprising computer executable instructions that when executed by one or more processors cause one or more processors to perform a computer-implemented method of consolidating a set of tenant log streams from the plurality of tenant databases into a consolidated log stream so that individual tenant log streams do not need to be individually stored on separate disks corresponding to each tenant log stream, the computer-implemented method comprising:

at a virtualization layer of a log consolidation host, intercepting 110 requests from the plurality of tenant log streams from the plurality of tenant databases;

linearizing the intercepted I/O requests from the plurality of tenant log streams into a physical log file that forms a consolidated log stream; storing the consolidated log stream in a log file;

generating a map from metadata associated with each tenant log stream, the map identifying log records from the plurality of tenant log streams, the log records being mapped to corresponding locations in the consolidated log stream to provide correlation of data associated with each tenant log stream consolidated into the consolidated log stream with a tenant database from which said data originated; and storing the map.

9. The computer readable storage device of claim 8, wherein generating the map from the metadata comprises updating metadata in mapping tables of the map as I/O requests for one or more of the plurality of tenant databases processed using the consolidated stream.

10. The computer readable storage device of claim 8, wherein generating the map comprises mapping a stream identifier and an offset in each tenant log stream to a corresponding offset in the consolidated log stream.

11. The computer readable storage device of claim 8, generating the map comprises mapping a stream identifier and a sector number for each tenant log stream to a log sequence number of a corresponding tenant log record that has data for the sector number.

12. The computer readable storage device of claim 8, further comprising exposing file system like APIs over the consolidated log stream to a database engine.

13. The computer readable storage device of claim 8, wherein storing the map comprises using native indexing methods of a backing database to perform efficient and persistent mapping using the consolidated log stream.

14. The computer readable storage device of claim 8, further comprising recovering one or more of the plurality of tenant databases by first recovering a database for the consolidated log stream and then recovering tenant log streams for individual tenant databases.

15. In a virtual computing environment that includes a plurality of tenant databases, a system architecture for a consolidated host that consolidates a set of tenant log streams from a plurality of tenant databases into a consolidated log stream so that individual tenant log streams do not need to be individually stored on separate disks corresponding to each tenant log stream, the system architecture for the consolidated host comprising:

a virtualization layer that intercepts 110 requests from a plurality of tenant log streams from a plurality of tenant databases;

a log file in which the consolidated log stream is stored;

one or more map tables that store a map from metadata associated with each tenant log stream;

one or more scanners which scan intercepted I/O requests from one or more tenant databases;

a log manager that processes intercepted and scanned I/O requests from one or more tenant databases;

one or more processors; and one or more storage memories storing executable instructions, which when executed by the one or more processors, causes the following computer-implemented method to be performed:

intercepting at said virtualization layer I/O requests from the plurality of tenant log streams from the plurality of tenant databases;

linearizing the intercepted I/O requests from the plurality of tenant log streams into a physical log file that forms a consolidated log stream; storing the consolidated log stream in the log file;

generating a map from metadata associated with each tenant log stream, the map identifying log records from the plurality of tenant log streams, and the log records being mapped to corresponding locations in the consolidated log stream to provide correlation of data associated with each tenant log stream consolidated into the consolidated log stream with a tenant database from which said data originated; and storing the map in the one or more map tables.

16. The system architecture of claim 15, wherein the stored map comprises updated metadata that is stored in mapping tables as I/O requests for one or more tenant databases are processed using the consolidated log stream.

17. The system architecture of claim 15, wherein the stored map comprises a stream identifier and an offset in each tenant log stream that maps to a corresponding offset in the consolidated log stream.

18. The system architecture of claim 15, wherein the stored map comprises a stream identifier and a sector number for each tenant log stream that are mapped to a log sequence number of a corresponding tenant log record that has data for the sector number.

19. The system architecture of claim 3, wherein one or more of the tenant databases are recovered by first recovering a database for the consolidated log stream and then recovering tenant log streams for individual tenant databases.

20. The system architecture of claim 15, wherein the map is stored using native indexing methods of a backing database to perform efficient and persistent mapping.

\* \* \* \* \*